(12) United States Patent
Ferlitsch

(10) Patent No.: US 8,402,373 B2
(45) Date of Patent: Mar. 19, 2013

(54) DEVICE CLONING METHOD FOR NON-PROGRAMMATIC INTERFACES

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 904 days.

(21) Appl. No.: 12/249,392

(22) Filed: Oct. 10, 2008

(65) Prior Publication Data

US 2010/0095214 A1 Apr. 15, 2010

(51) Int. Cl.
*G06F 3/00* (2006.01)

(52) U.S. Cl. ........ 715/733; 715/762; 715/760; 709/203; 709/220; 709/223

(58) Field of Classification Search .................... 715/733
See application file for complete search history.

(56) References Cited

U.S. PATENT DOCUMENTS

| | | | | |
|---|---|---|---|---|
| 5,699,494 A * | 12/1997 | Colbert et al. | ............... | 358/1.15 |
| 5,946,458 A * | 8/1999 | Austin et al. | .................. | 358/1.15 |
| 6,067,407 A * | 5/2000 | Wadsworth et al. | .......... | 709/224 |
| 6,112,256 A * | 8/2000 | Goffinet et al. | .................... | 710/8 |
| 6,349,304 B1 * | 2/2002 | Boldt et al. | ............................ | 1/1 |
| 6,466,972 B1 * | 10/2002 | Paul et al. | ...................... | 709/222 |
| 6,810,429 B1 * | 10/2004 | Walsh et al. | ...................... | 709/246 |
| 7,016,740 B2 | 3/2006 | Nakamura et al. | | |
| 7,047,088 B2 * | 5/2006 | Nakamura et al. | ............... | 700/19 |
| 7,392,299 B2 * | 6/2008 | Maekawa | ........................ | 709/220 |
| 2002/0161740 A1 * | 10/2002 | Nakamura et al. | ................. | 707/1 |
| 2002/0174209 A1 | 11/2002 | Sesek et al. | | |
| 2002/0196451 A1 * | 12/2002 | Schlonski et al. | ............. | 358/1.1 |
| 2003/0030842 A1 * | 2/2003 | Suyehira | ...................... | 358/1.15 |
| 2003/0033395 A1 * | 2/2003 | Sato | ............................... | 709/223 |
| 2003/0050969 A1 * | 3/2003 | Sant et al. | ..................... | 709/203 |
| 2003/0063305 A1 * | 4/2003 | McIntyre | ...................... | 358/1.13 |
| 2003/0220969 A1 * | 11/2003 | Kojima et al. | ................. | 709/203 |
| 2005/0286071 A1 * | 12/2005 | Faynor | .......................... | 358/1.15 |

(Continued)

FOREIGN PATENT DOCUMENTS

| | | |
|---|---|---|
| JP | 08-234945 | 9/1996 |
| JP | 11-085497 | 3/1999 |

(Continued)

OTHER PUBLICATIONS

Hagino Junichi, Device Driver System, JP 2007-272857, published on Oct 18, 2007, abstract, 1 page.*

(Continued)

*Primary Examiner* — William Bashore
*Assistant Examiner* — Reza Nabi
(74) *Attorney, Agent, or Firm* — Brooks Acordia IP Law, PC; Pejman Yedidsion; David Ripma

(57) ABSTRACT

Devices, methods, and computer-readable media for cloning a device setting input from a user by aggregating a user interface based on two or more members of plurality of peripheral computing devices, e.g., multifunction peripheral rendering and/or printing devices, having a user interface where two or more members of the plurality of user interfaces each require a user input; replicating a user input of at least one member of the plurality of user interfaces based on the aggregated user interface; and outputting for routing, to two or more members of the plurality of peripheral computing devices a replicated user setting based on the aggregated user interface.

19 Claims, 6 Drawing Sheets

U.S. PATENT DOCUMENTS

| | | | |
|---|---|---|---|
| 2006/0047693 A1* | 3/2006 | Kojima et al. | 707/102 |
| 2006/0184703 A1* | 8/2006 | Shibata | 710/104 |
| 2009/0144640 A1* | 6/2009 | Schneider et al. | 715/760 |
| 2009/0235173 A1* | 9/2009 | Ichihara | 715/733 |
| 2009/0265645 A1* | 10/2009 | Park et al. | 715/762 |

FOREIGN PATENT DOCUMENTS

| | | |
|---|---|---|
| JP | 2000-155658 | 6/2000 |
| JP | 2005-197935 | 7/2005 |
| JP | 2007-011808 | 1/2007 |
| JP | 2007-272857 | 10/2007 |
| WO | WO 2005/026969 A1 | 3/2005 |

OTHER PUBLICATIONS

Fielding,R.;Gettys,J.;Mogul,J.C.;Frystyk,H.;Masinter,L.;Leach,P.;Berners- Lee, T: "Hypertext Transfer Protocol—HTTP/1.1", Jun. 1999, RFC2616, Networking Group, Standards Track.

"HTML 4.01 Specification" W3C Recommendation, Dec. 24, 1999 [Internet] Retrieved from the Internet Oct. 6, 2008, <URL:http://www.w3.org/TR/1999/REC-html401-19991224/>.

* cited by examiner ical interface, thereby leaving the human interactive interface as the only alternative to address settable features where typically each device must be manually programmed by the user.

DEVICE CLONING METHOD FOR NON-PROGRAMMATIC INTERFACES

FIELD OF ENDEAVOR

The present invention in its several embodiments relates generally to monitoring and control of computing devices serving a host computer, and more particularly to cloning device settings input from a user, by cloning the input after aggregating a user interface for each of a plurality of the computing devices serving the host computer.

BACKGROUND

Presently, not all features on each imaging device in a network are accessible programmatically (e.g., SNMP, WSDL, etc) by a user. Instead, a subset of features may only be settable through a human interactive interface, such as an embedded web page. In other networks, a management system may be unaware of the programmatic interface, thereby leaving the human interactive interface as the only alternative to address settable features where typically each device must be manually programmed by the user.

Operating a printer via a remote user interface (UI) is disclosed in Japanese pending patent application no. JP08234945, where a printer sends a description of its UI to a printer driver on a host PC. In FIG. 1, the architecture 100 depicts a printer driver 112 that renders, at the host PC 110, a UI 114 for operating the printer based on the UI description from the printer 120. Inputs from the rendered UI on the driver are then sent to the single printer. But, this architecture and its method of operation appear limited in that it sets settings on a single printer and that there is no aggregation of multiple non-programmatic UIs.

U.S. Pat. No. 5,699,494 discloses a means for a printer to replicate its front panel on a remote host. In this method, the printer sends a replication description of its UI to a host PC. In FIG. 2, the process flow architecture 200 and method of operation are depicted where the host PC 210 replicates a UI 220 that is the same as, or similar to, the UI 230 on the front panel of the printer 240. The printer may then be operated either by the local or replicated UI. The UIs are synchronized, such that an update to one UI is replicated in the other UI. But, this method is limited in that it only sets settings on a single printer and there is no aggregation of multiple non-programmatic UIs.

US patent publication no. 2002/0161740 A1 discloses a means for a device management application to manage devices in device groups. FIG. 3 depicts a process 300 in which a user can group printers into subgroups, e.g., logical group A 310 and logical group B 320. A printer, e.g., device A4 312, may also belong to more than one subgroup. Each subgroup can be associated with a set of settings 330. The settings are then cloned 331, 332, 333 to each printer in the respective subgroup. But, this method is limited in that: there is no aggregation of multiple non-programmatic UIs.

SUMMARY

The present invention may be embodied via devices, methods, and computer-readable media for cloning a device setting input from a user by aggregating a user interface based on two or more members of a plurality of computing devices having a user interface, where two or more members of the plurality of user interfaces each require a user input; replicating a user input of at least one member of the plurality of user interfaces based on the aggregated user interface; and outputting for routing, to two or more members of the plurality of peripheral computing devices, a replicated user setting based on the aggregated user interface. For example, the invention may be embodied as an exemplary computing device comprising: a processing unit and addressable memory; where the processing unit is adapted to execute one or more instructions to: (a) aggregate a user interface based on two or more members of a plurality of computing devices having a user interface, where two or more members of the plurality of user interfaces each require a user input; (b) replicate a user input of at least one member of the plurality of user interfaces based on the aggregated user interface; and (c) output for routing, to two or more members of the plurality of peripheral computing devices, a replicated user setting based on the aggregated user interface. The processing unit of the computing device may be further adapted to aggregate the user interfaces according to two or more groups based on comparing UI responses. In some embodiments, the plurality of user interfaces comprises a first user interface comprising a layout and content and a second user interface comprising a layout and content, and the processing unit may be further configured to aggregate based on the first user interface having a layout identical to the second user interface and then based on the first user interface having content identical to the second user interface. In addition, the computing device may output the replicated user interface to a peripheral rendering device and/or a multifunctional peripheral device. Also, the processing unit may be further configured to execute one or more instructions to display an aggregate user interface from each instance of a content-aggregated user interface group.

The invention may be practiced by one or more computing devices. Accordingly, the invention may be embodied, by example, as a machine-enabled method of cloning a device setting input from a user comprising: (a) aggregating a user interface based on two or more members of a plurality of peripheral computing devices having a user interface, where two or more members of the plurality of user interfaces each require a user input; (b) replicating a user input of at least one member of the plurality of user interfaces based on the aggregated user interface; and (c) outputting for routing, to two or more members of the plurality of peripheral computing devices, a replicated user setting based on the aggregated user interface. The step of aggregating the user interfaces may be according to two or more groups based on comparing UI responses. The plurality of user interfaces may include a first user interface having a layout and content and a second user interface having a layout and content, and in some embodiments the step of aggregating may further include aggregating based on the first user interface having a layout identical to the second user interface and then based on the first user interface having content identical to the second user interface. As with the exemplary device embodiment, the exemplary method or process embodiments may output via peripheral computing devices, such as a peripheral rendering device and/or a multifunctional peripheral device. Also, some process or method embodiments may further include a step of displaying an aggregate user interface from each instance of a content-aggregated user interface group.

The invention may be carried out for purposes of storage and installation, for example. Accordingly, the invention may be embodied as a computer-readable medium having computer-executable instructions stored thereon which, when executed by a computer, are operative to cause the computer to perform one or more instructions of cloning a device setting input from a user by: (a) aggregating a user interface based on two or more members of a plurality of peripheral computing devices having a user interface, where two or more members of the plurality of user interfaces each require a user input; (b) replicating a user input of at least one of the plurality of user interfaces based on the aggregated user interface; and (c) outputting for routing, to two or more members of the plurality of peripheral rendering devices, a replicated user setting based on the aggregated user interface. Optionally, the instruction to aggregate the user interfaces of the computer-readable medium may be to aggregate according to two or more groups based on comparing UI responses and the output may be prepared for a computing device, such as a peripheral rendering device and/or a multifunctional peripheral device. The plurality of user interfaces may be a first user interface comprising a layout and content and a second user interface comprising a layout and content. For some embodiments, the instruction to aggregate further includes instructions to aggregate based on the first user interface having a layout identical to the second user interface and then based on the first user interface having content identical to the second user interface. As with the exemplary device embodiment, the exemplary computer-executable instructions may include an instruction to output via a peripheral computing device, such as a peripheral rendering device and/or a multifunctional peripheral device. Also some computer-executable instructions may further include one or more instructions to display an aggregate user interface from each instance of a content-aggregated user interface group.

BRIEF DESCRIPTION OF THE DRAWINGS

Embodiments of the present invention are illustrated by way of example and not limitation in the figures of the accompanying drawings, and in which.

DETAILED DESCRIPTION

A non-programmatic interface is herein defined as an interface that requires human interaction. This non-programmatic interface may be embodied as one or more embedded web pages in a computing peripheral device and such an interface may then be displayed via a web browser on a host PC. The exemplary embodiments of the invention described herein are systems, methods, and computer-readable media for simultaneous manual programming of a group of devices via a non-programmatic interface, such as human user interactive interface. That is, the invention embodiments comprise systems, methods and computer-readable media to clone device settings on a group of devices through a human interactive interface, such as an embedded web page. The exemplary operating environment includes one or more imaging devices, such as multifunction peripheral (MFP) devices and/or printers. Each device of the group has a remote non-programmatic interface, such as an embedded web page, for operating the device via a web browser on a host PC. The exemplary operating environment additionally includes a device management application running on a host that manages the MFP devices. The management facility provides some level of device cloning functionality.

Embodiments of the present invention include a device management application that has a user interface (UI) aggregation capability, such as for UIs implemented as web pages. A user/operator assigns devices to one or more device groups. Within a group, an operator can make a request for a specific UI, e.g., a default print settings page. The UI request, originating from a web page, is then made to all the devices in the device group. Each device then responds back with its UI, e.g., with its web page, to the device management application. According to the teachings herein, the program application aggregates the multiple UIs into a single UI. The operator may then enter input into the single UI as an aggregate in order to have the functionality of cloning the device settings. Accordingly, the inputs are then replicated and passed back to each device in the device group.

Figure 1:
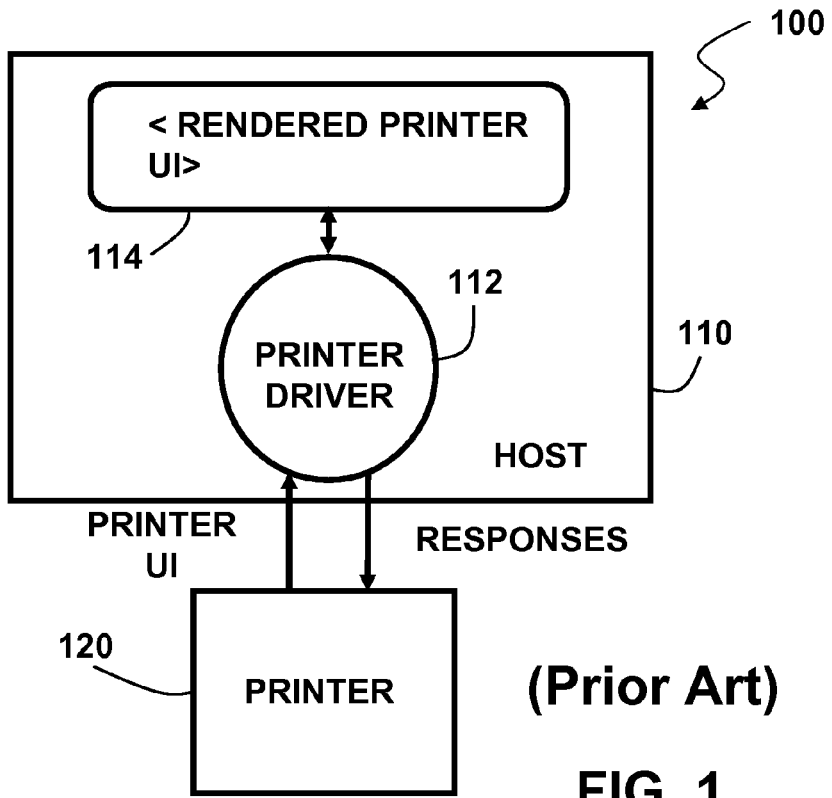
FIG. 1 illustrates a printer UI architecture of the prior art.
Figure 2:
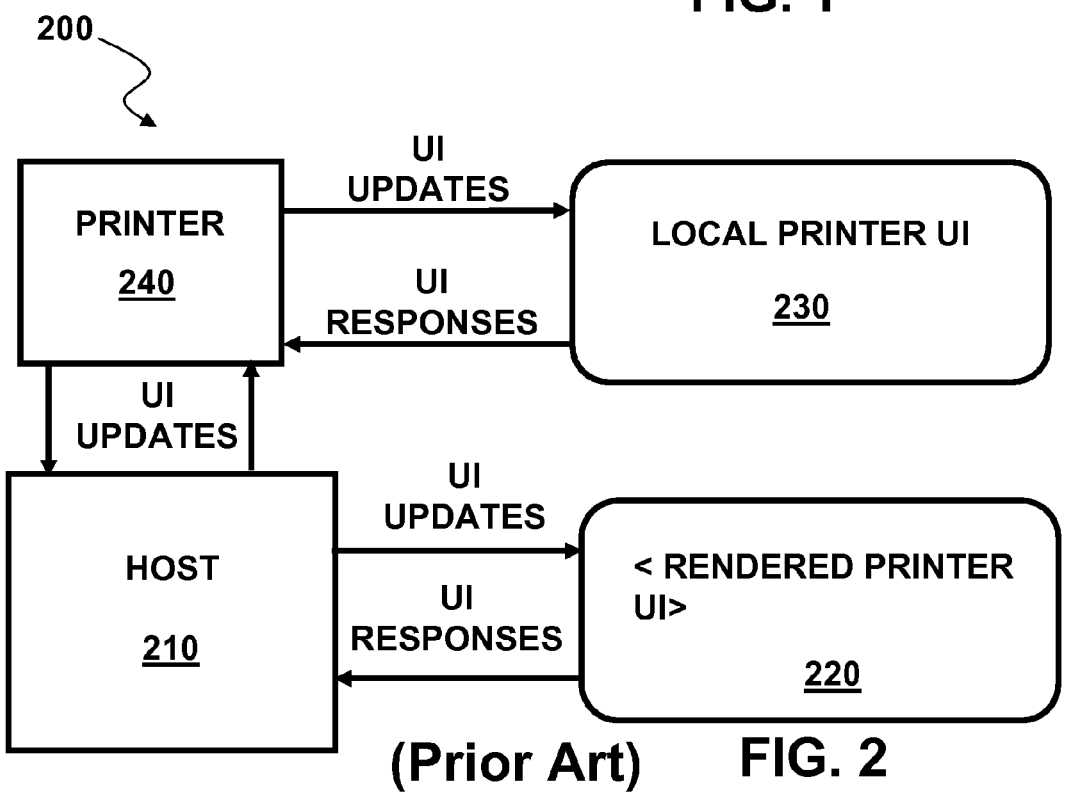
FIG. 2 illustrates a printer UI architecture of the prior art.
Figure 3:
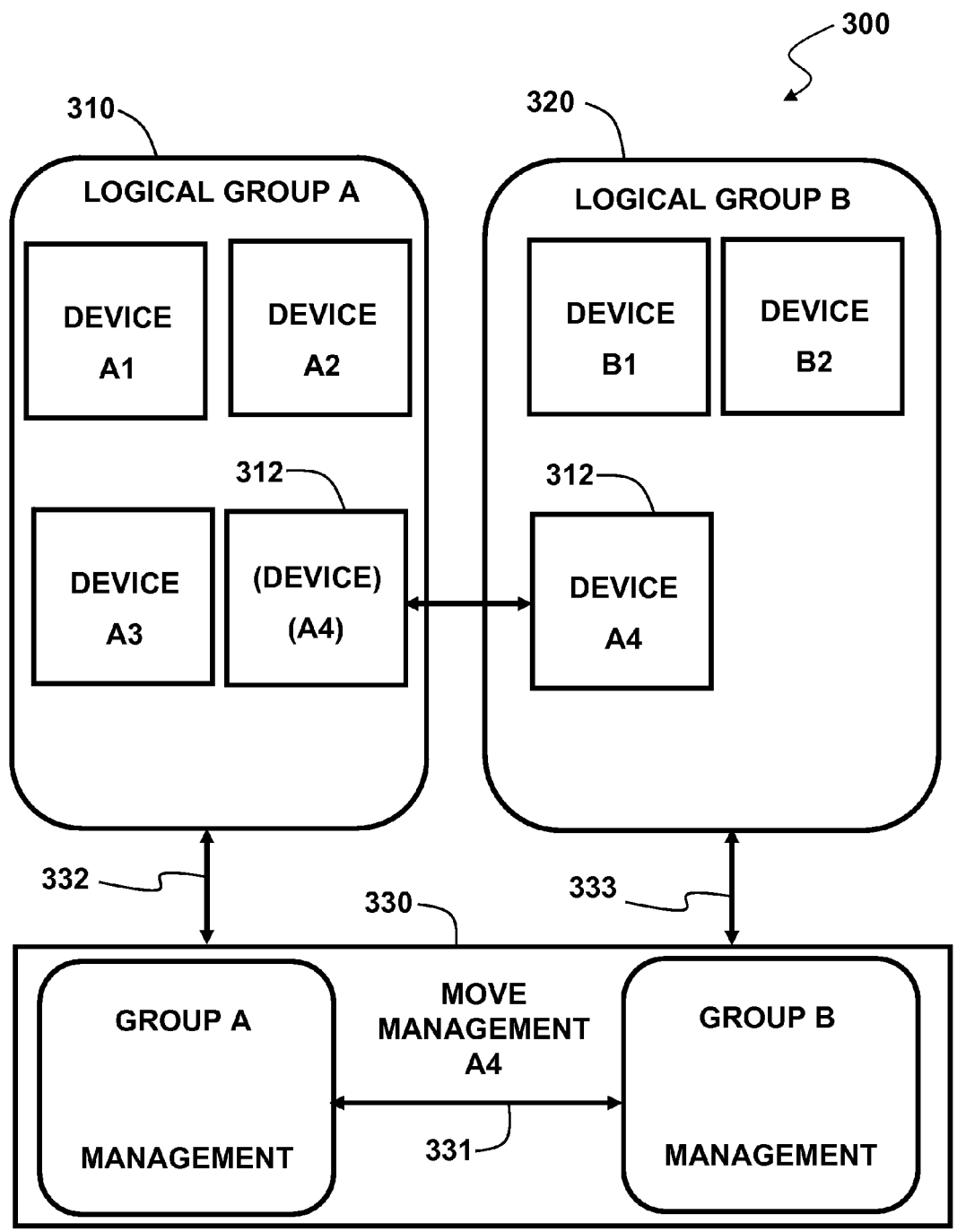
FIG. 3 illustrates a printer UI architecture of the prior art.
Figure 4A:
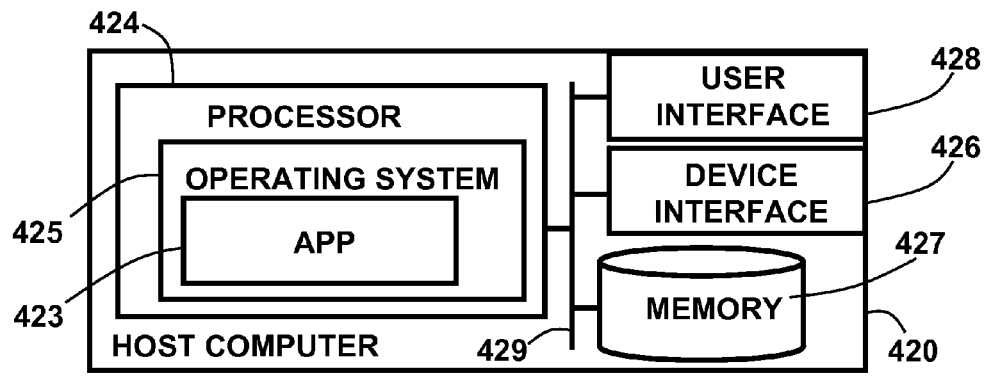
FIG. 4A illustrates an exemplary device embodiment of the present invention.

Embodiments of the present invention may be executed via a computing device, such as the host computer shown in FIG. 4A. The exemplary computing device or host computer 420 comprises a processor 424 such as a central processing unit (CPU), addressable memory 427, an external device interface 426, e.g., a universal serial bus (USB) port and related processing and an Ethernet port and related processing, and a user interface 428, e.g., a display, and keyboard and/or pointer-mouse system and/or a touch screen. These elements may be in communication with one another via a data bus 429. Via an operating system 425, the processor 424 may be configured to execute steps of a device management application 423 according to the exemplary embodiments of the present invention.

Exemplary Operating Environment

Figure 4B:
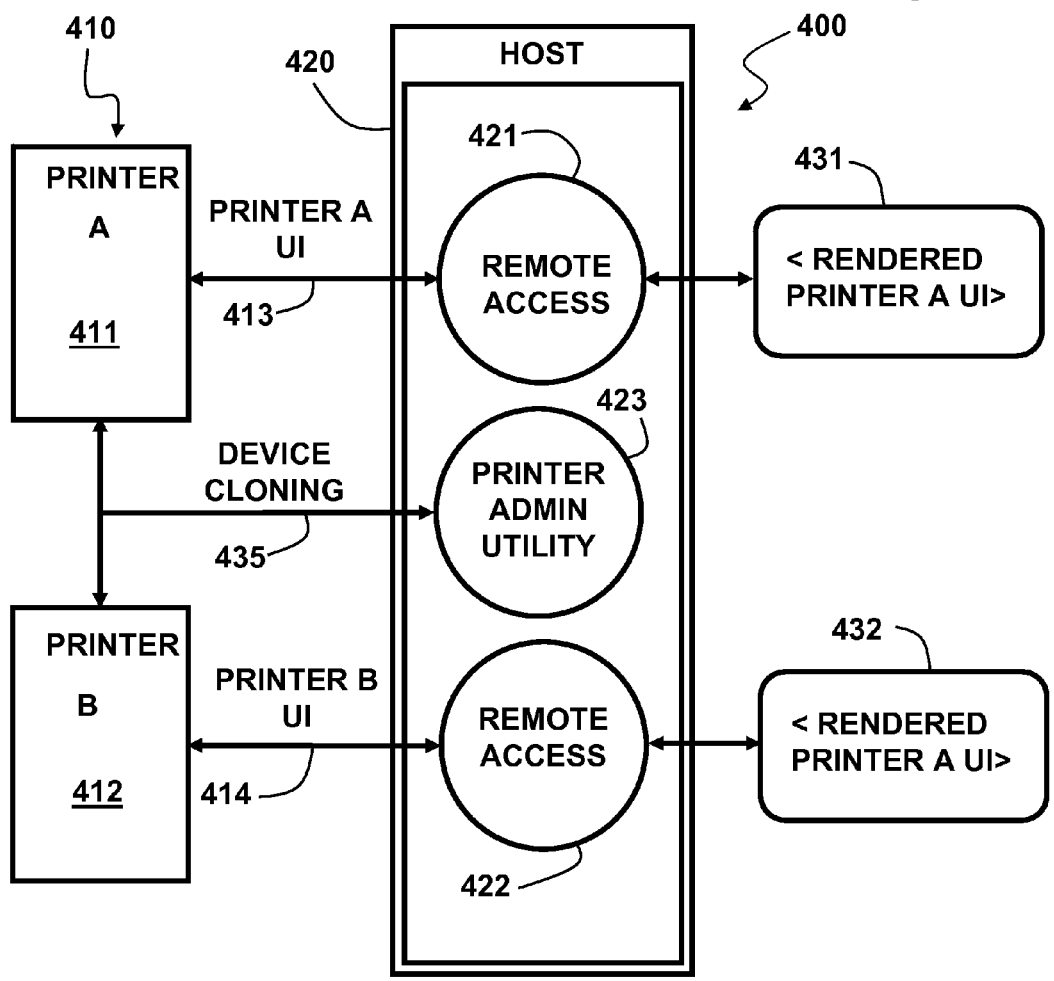
FIG. 4B illustrates an exemplary printer UI architecture embodiment of the present invention.

FIG. 4B is an example of the exemplary operating environment. The exemplary operating environment 400 includes a plurality of MFP devices 410, e.g., printer A 411 and printer B 412. Additional examples of devices that may comprise the operating environment are: printers; scanners; copiers; facsimile machines; plotters; filing devices; format converters, audiovisual (A/V) players and/or recorders; display devices; publishing devices; digital whiteboards; Internet-connected appliances; computers; servers; and software applications services, e.g., world wide web-based services. Each of the devices may have a non-programmatic interface 413, 414 for the operating parameters of, or making settings for, the particular device. Accordingly, the host may support remote access 421, 422 to the device, 411, 412 and render a UI 431, 432 for the remotely accessible device 411, 412. Additionally, the devices may be managed at a host 420 by a device management application 423 that allows for a grouping of devices and the functionality of device cloning 435 for some select set of device features and/or settings.

Remote UI Request for MFP Device Group

Figure 5:
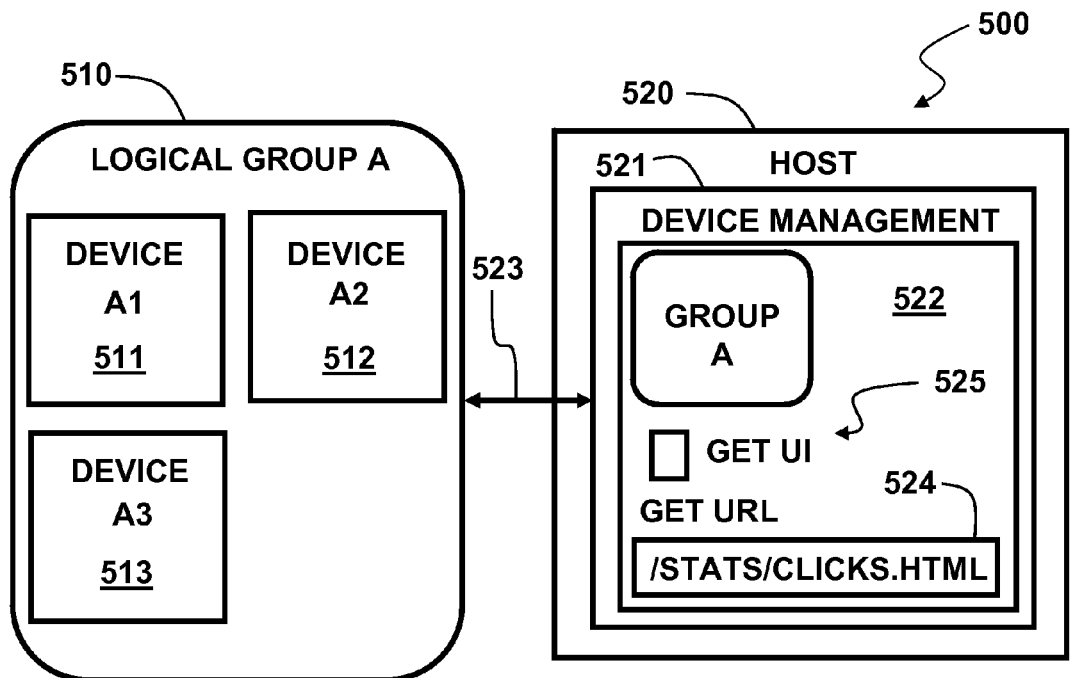
FIG. 5 illustrates an exemplary printer UI architecture embodiment of the present invention.
Figure 6:
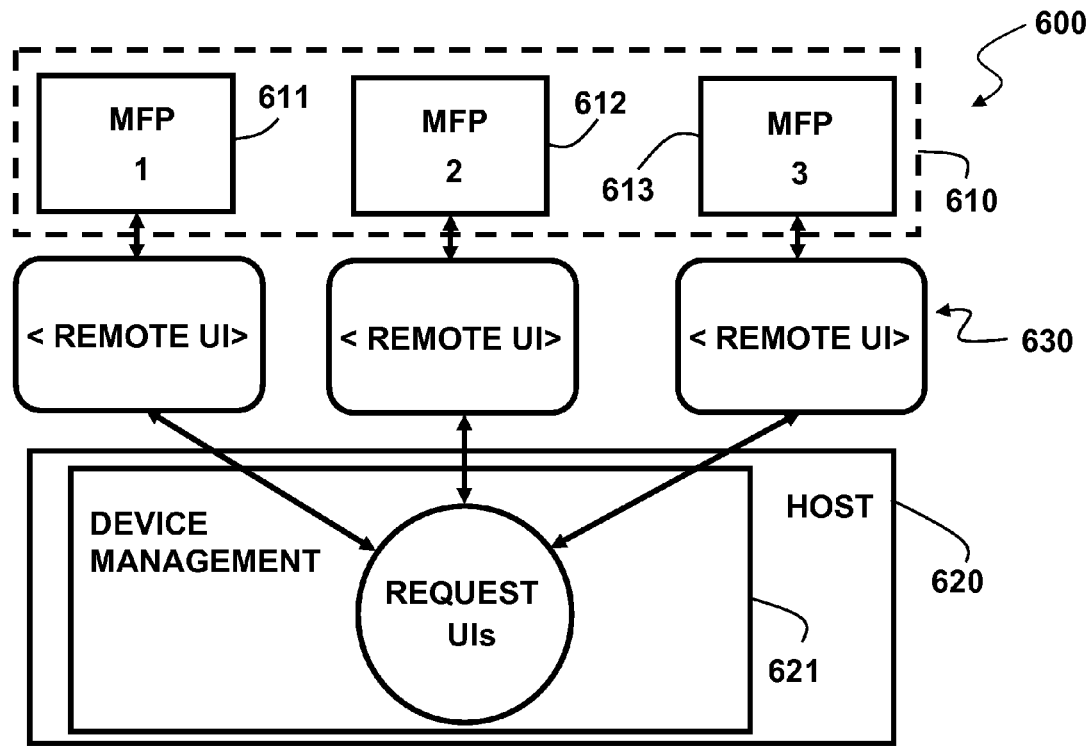
FIG. 6 illustrates an exemplary printer UI architecture embodiment of the present invention.

FIG. 5 is an example of an embodiment 500 of the invention as a device management application 521 supported by a host 520 that in turn supports the operator/user via an exemplary display 522 in making a request 523 for the remote UI of two or more of the devices 511-513 of a logical group, e.g., logical group A 510, by perhaps clicking a radio button or other indicating region 525. The device management application, when executing steps of a process, may display an input box 524 where the user may specify the relative URL i.e., the URL of/to the device, of an embedded web page to view. The web page of a device may comprise: a printer clicks page, a system settings page, an alert notification page, a page of one or more network settings, a user access management page, a power consumption settings page, and a page of a job queue. FIG. 6 illustrates an exemplary architecture 600 where a PC host 620 environment supports the device management application 621 embodiment that may then replicate the UI, e.g., the web page as the UI, and make a request of each UI of the devices 630 in the device group. For example, the device management application may make an HTTP connection, e.g., "port 80," to each device in the group 610 and then request the user's specified web page, e.g., stats/clicks.html, from each HTTP connection (FIG. 5). The device management application embodiment 621 may then monitor whether each device 611-613 successfully responded. The device management application embodiment 621 may use a predetermined, or programmable, time period in which to expect, e.g., countdown for, a response. If no response is received within that time period, the application 621 may continue processing by treating the absence of a response as if the monitored device failed to provide a remote UI for the UI request. Otherwise, the response is checked for an indication of failure. In the case of hypertext markup language (HTML), a non-200-level response would be treated as a failure, where 200-series HTTP response codes indicate that a request was processed without any error condition. The device management application 621 may then maintain a list of the responding devices and a list of the devices that did not respond successfully. If one or more devices failed to respond successfully, the application may prompt the user to continue, or the user may have other input means, e.g., a keyboard entry, mouse-pointer system, and/or a touch screen display, by which to optionally terminate the process.

UI Aggregation

Figure 7:
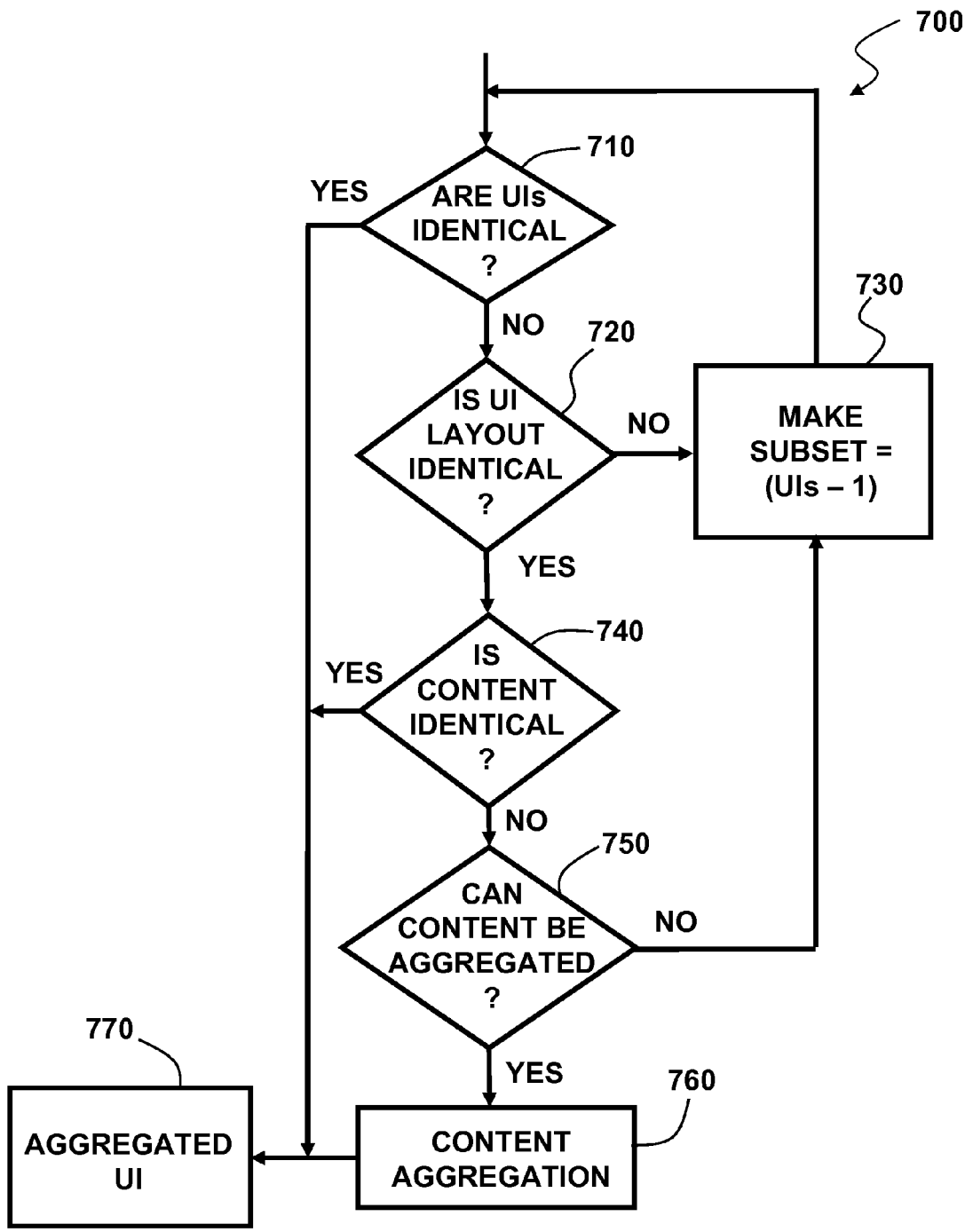
FIG. 7 is a top level flowchart of an exemplary aggregating process embodiment of the present invention.

After receiving responses from the device group, a device management application embodiment may attempt to aggregate all the successful UI responses into a single aggregated UI. An aggregating method embodiment is shown in FIG. 7 and for purposes of illustration: (a) an identical layout may be determined between a first UI and a second UI where the first UI has the same output fields, e.g., total printer clicks, and the same input control, e.g., sleep interval period, as a second UI; and (b) an identical content may be determined between the output fields of a first UI and the output fields of a second UI where, on an output field-by-output field basis across all output fields, the first UI has the same values as the second UI. Referring to FIG. 7, an exemplary process embodiment 700, when loaded on a host computer, may cause the host to operate with the following steps: (a) testing (test 710) whether the UIs within the device group are identical, and if so, aggregating the UIs (process block 770); otherwise (b) testing (test 720) whether the UIs within the device group, although not identical, have identical layouts. If not, the subsets of UIs (process block 730) may be generated to be processed again at the subset level and tested for identical UIs 710. If the UIs within the device group, although not identical, have identical layouts, then (c) testing (test 740) whether the content is identical. If the content is identical, then aggregating the UIs (process block 770). If the content is not identical, then (d) testing (test 750) whether non-identical content may be aggregated according to an available aggregation process. If so, then the content is aggregated (process block 760) and the UIs are aggregated (process block 770).

Accordingly, the process of FIG. 7 groups the UI responses into groups of identical UI responses. If all the UIs are in a single group (test 710), then the aggregate UI is the identical response in the group. The process merges groups of identical UI responses into groups of identical UI layouts (test 720 and process block 730). The process merges the groups of identical UI layouts into groups of identical content. If all the UIs are in a single identical content group (test 740), then the exemplary process may aggregate UI in any instance of a UI response in the group (process block 770). The exemplary process may then merge the groups of identical content UI (test 750) into groups where the differing content can be aggregated (process block 760). Embodiments of the present process invention allow for a number of different rules that may be used for aggregation. Exemplary aggregation rules include: (i) replacing each instance of differing content with a list of differing value instances where each value instance may be separated by a comma; or (ii) replacing each instance of differing content with a blank or marked out, non-updateable, region. If all the UIs are in a single content aggregated group, then, according to the process, the aggregate UI may be the content aggregated UI in the group. When there is a plurality of content aggregated UI groups, the process may display an aggregate UI from each instance of a content aggregated UI group.

Another process embodiment groups the UI responses into groups having identical UI responses within each group. Optionally, if there is a plurality of groups, the process may have a process step that generates a group of aggregate UIs, e.g., one per group of identical UI responses. The exemplary process embodiment also comprises merging groups of identical UI responses into groups of identical UI layouts and merging the groups of identical UI layouts into groups of identical content. As an option, if there is a plurality of groups, the process embodiment may include a step of generating a group of aggregate UIs, e.g., one per group of identical content UI responses. The exemplary process continues with merging identical content UIs into groups where the differing content may be aggregated. The process may then display an aggregate UI from each instance of a content-aggregated UI group.

Aggregate UI: Input and Response

Figure 8:
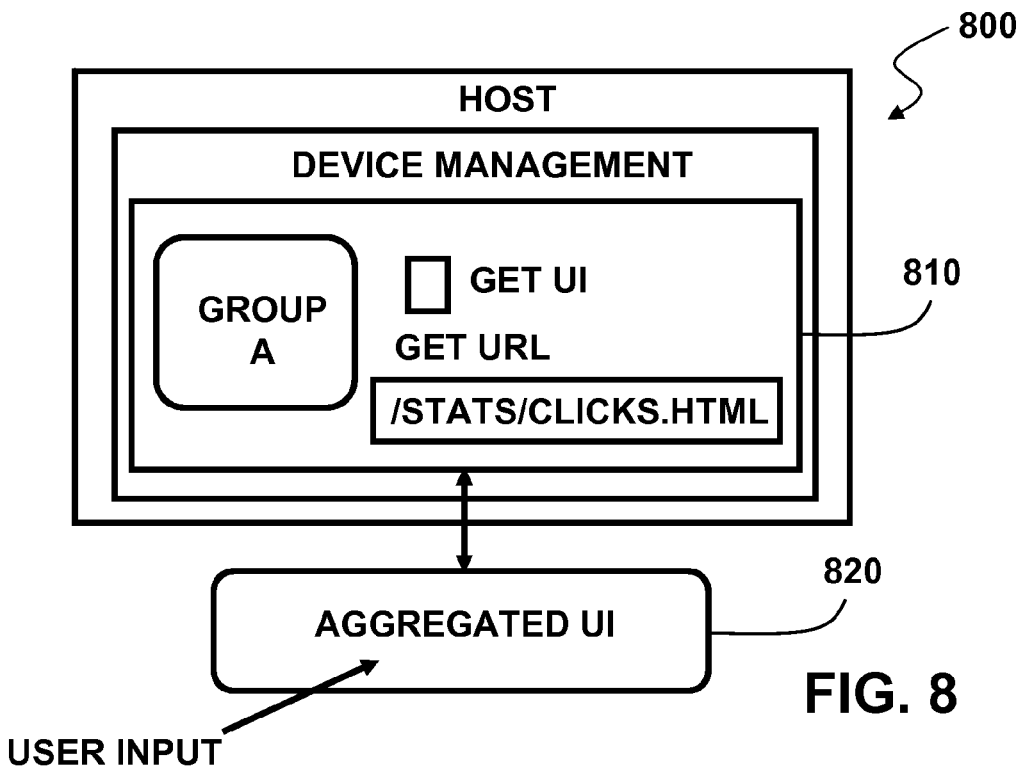
FIG. 8 illustrates an exemplary printer UI architecture embodiment of the present invention.
Figure 9:
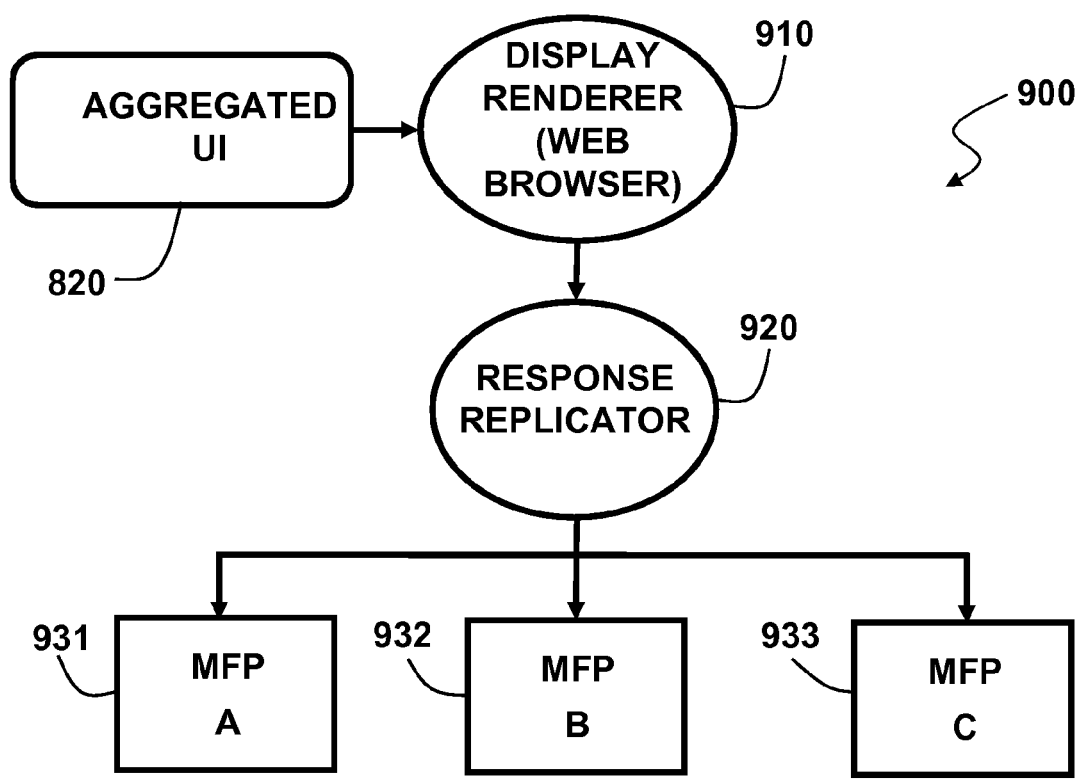
FIG. 9 illustrates an exemplary printer UI architecture embodiment of the present invention.

FIG. 8 is a block diagram 800 that illustrates that for each aggregate UI displayed 810, e.g., for the instances of web browser pages, the user may enter the appropriate input 820 for the setting. FIG. 9 is an exemplary architecture 900 illustrating that the input 820 may then be passed, via a display renderer 910 (e.g., a web browser), to a response replicator 920, that is configured to replicate and route an identical response to each MFP device 931-933 in the aggregated content UI group. For example, the response may include an HTML post command from an input form for setting a single or group of one or more particular variables.

Based on the foregoing, it should be appreciated that systems, methods, and computer-readable media for the cloning of device settings within a group are provided herein. One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computing device comprising:
a processing unit and addressable memory;
wherein the processing unit is configured to:
aggregate a user interface based on two or more members of a plurality of peripheral computing devices each having a user interface and further aggregate according to two or more groups of devices, wherein the further aggregation is based on a comparison of user interface responses, and group the devices based on a determined set of user interfaces, wherein the determined set of user interfaces is based on a comparison of a set of identical characteristics and a set of differing characteristics, each characteristic associated with the user interface responses, wherein the two or more members of the plurality of user interfaces each require a user input to generate the user interface responses, and wherein the aggregate results in the plurality of user interfaces used as a single user interface;
replicate a user input of at least one member of the plurality of user interfaces based on the aggregated user interface; and
output for routing, to two or more members of the plurality of peripheral computing devices, a replicated user setting based on the aggregated user interface, wherein the plurality of user interfaces comprises a first user interface comprising a layout and content and a second user interface comprising a layout and content, and wherein the processing unit is further configured to aggregate based on the first user interface having an identical layout to the second user interface and then based on the first user interface having an identical content to the second user interface and wherein the identical layout is determined based on having same output fields and same input controls in the first user interface and the second user interface; and the identical content is determined based on having same values on an output field-by-output field basis across all output fields in the first user interface and the second user interface.

2. The computing device of claim 1 wherein at least one member of the plurality of peripheral computing devices is a peripheral rendering device.

3. The computing device of claim 1 wherein at least one member of the plurality of peripheral computing devices is a multifunctional peripheral device.

4. The computing device of claim 1 wherein the processing unit is further configured to display an aggregate user interface from each instance of a content-aggregated user interface group of devices.

5. The computing device of claim 1 wherein the user interface is a web page.

6. The computing device of claim 1 wherein the processing unit is further configured to:
aggregate the user interface based on comparing a set of one or more output fields.

7. The computing device of claim 1 wherein the processing unit is further configured to aggregate the user interfaces according to two or more groups of devices based on comparing identical user interface responses.

8. The computing device of claim 1 wherein the user interface responses are based on the user input.

9. The computing device of claim 1 wherein the processing unit is further configured to aggregate the user interfaces based on a sent request to each of the peripheral computing devices.

10. The computing device of claim 1 wherein the processing unit is further configured to:
merge the set of identical characteristics of the user interface responses into groups of identical user interface layouts.

11. The computing device of claim 10 wherein the processing unit is further configured to:
merge the identical user interface layouts into groups of identical user interface content.

12. A machine-enabled method of cloning a device setting input from a user comprising:
aggregating a user interface based on two or more members of a plurality of peripheral computing devices each having a user interface and further aggregating according to two or more groups of devices, wherein the further aggregating is based on comparing user interface responses, and group the devices based on a determined set of user interfaces, wherein the determined set of user interfaces is based on comparing a set of identical characteristics and a set of differing characteristics, each characteristic associated with the user interface responses, wherein the two or more members of the plurality of user interfaces each require a user input to generate the user interface responses, and wherein the aggregating results in the plurality of user interfaces used as a single user interface;
replicating a user input of at least one member of the plurality of user interfaces based on the aggregated user interface; and
outputting for routing, to two or more of the plurality of peripheral computing devices, a replicated user setting based on the aggregated user interface, wherein the plurality of user interfaces comprises a first user interface comprising a layout and content and a second user interface comprising a layout and content, and wherein the step of aggregating further comprises aggregating based on the first user interface having an identical layout to the second user interface and then based on the first user interface having an identical content to the second user interface and wherein the identical layout is determined based on having same output fields and same input controls in the first user interface and the second user interface; and the identical content is determined based on having same values on an output field-by-output field basis across all output fields in the first user interface and the second user interface.

13. The machine-enabled method of claim 12 wherein at least one member of the plurality of peripheral computing devices is a peripheral rendering device.

14. The machine-enabled method of claim 12 wherein at least one member of the plurality of peripheral computing devices is a multifunctional peripheral device.

15. The machine-enabled method of claim 12 further comprising displaying an aggregate user interface from each instance of a content-aggregated user interface group of devices.

16. A non-transitory computer-readable medium having computer-executable instructions stored thereon which, when executed by a computer, are operative to cause the computer to:
perform one or more instructions of cloning a device setting input from a user by:
aggregating a user interface of based on two or more member of a plurality of peripheral computing devices each having a user interface and further aggregating according to two or more groups of devices, wherein the further aggregating is based on comparing user interface responses, and group the devices based on a determined set of user interfaces, wherein the determined set of user interfaces is based on comparing a set of identical characteristics and a set of differing characteristics, each characteristic associated with the user interface responses, wherein the two or more members of the plurality of user interfaces each require a user input to generate the user interface responses, and wherein the aggregating results in the plurality of user interfaces used as a single user interface;
replicating a user input of at least one member of the plurality of user interfaces based on the aggregated user interface; and
outputting for routing, to two or more members of the plurality of peripheral computing devices, a replicated user setting based on the aggregated user interface, wherein the plurality of user interfaces comprises a first user interface comprising a layout and content and a second user interface comprising a layout and content, and wherein the instructions of aggregating further comprises aggregating based on the first user interface having an identical layout to the second user interface and then based on the first user interface having an identical content to the second user interface and wherein the identical layout is determined based on having same output fields and same input controls in the first user interface and the second user interface; and the identical content is determined based on having same values on an output field-by-output field basis across all output fields in the first user interface and the second user interface.

17. The computer-readable medium of claim 16 wherein at least one member of the plurality of peripheral computing devices is a peripheral rendering device.

18. The computer-readable medium of claim 16 wherein at least one member of the plurality of peripheral computing devices is a multifunctional peripheral device.

19. The computer-readable medium of claim 16 wherein the instructions further comprise displaying an aggregate user interface from each instance of a content-aggregated user interface group of devices.

* * * * *